US011258103B2

(12) United States Patent
McIntyre et al.

(10) Patent No.: US 11,258,103 B2
(45) **Date of Patent: *Feb. 22, 2022**

(54) ZINC ALKALINE SECONDARY BATTERY INCLUDING ANCHORED ELECTROLYTE ADDITIVES

(71) Applicant: ZAF Energy Systems, Incorporated, Bozeman, MT (US)

(72) Inventors: Melissa D. McIntyre, Butte, MT (US); Ernest Rimanosky, Kalispell, MT (US); Adam Weisenstein, Bozeman, MT (US); Cody R. Carter, Kalispell, MT (US); Allen Charkey, Winter Haven, FL (US)

(73) Assignee: ZAF ENERGY SYSTEMS, INCORPORATED, Bozeman, MT (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/820,384

(22) Filed: Mar. 16, 2020

(65) Prior Publication Data

US 2020/0220224 A1 Jul. 9, 2020

Related U.S. Application Data

(63) Continuation-in-part of application No. 16/133,455, filed on Sep. 17, 2018.

(51) Int. Cl.

*H01M 10/26* (2006.01)
*H01M 10/04* (2006.01)
*H01M 4/131* (2010.01)

(52) U.S. Cl.

CPC .......... *H01M 10/26* (2013.01); *H01M 4/131* (2013.01); *H01M 10/0459* (2013.01)

(58) Field of Classification Search

CPC ............... H01M 10/05; H01M 10/054; H01M 10/056–0569; H01M 10/24–288;

(Continued)

(56) References Cited

U.S. PATENT DOCUMENTS

| | | | |
|---|---|---|---|
| 2011/0086252 | A1 | 4/2011 | Phillips |
| 2013/0323565 | A1 | 12/2013 | Tucholski |
| 2015/0349344 | A1 | 12/2015 | Shelekhin et al. |

FOREIGN PATENT DOCUMENTS

| | | | |
|---|---|---|---|
| CN | 102044713 | A | 5/2011 |
| JP | S6196662 | S | 5/1986 |

(Continued)

OTHER PUBLICATIONS

Machine translation of Hayashi et al. (JP 2015-197976). Published Nov. 9, 2015. (Year: 2015).*

(Continued)

*Primary Examiner* — Jonathan Crepeau
*Assistant Examiner* — Jacob Buchanan
(74) *Attorney, Agent, or Firm* — Brooks Kushman P.C.

(57) ABSTRACT

A zinc alkaline secondary battery includes a positive electrode, a negative electrode including a multi-valent oxide species, a separator system disposed between the electrodes, and an alkaline electrolyte in contact with the negative electrode. The alkaline electrolyte includes hexametaphosphate salt and zinc acetate. Ligands from the hexametaphosphate salt and zinc acetate are anchored to the negative electrode via chelation sites created by the multi-valent oxide species.

15 Claims, 4 Drawing Sheets

(58) Field of Classification Search
CPC ....... H01M 4/131; H01M 4/139–1391; H01M 4/24–244; H01M 4/36; H01M 4/38; H01M 4/383–385; H01M 4/42; H01M 4/46; H01M 4/466; H01M 4/62; H01M 4/628; H01M 50/40–497
See application file for complete search history.

(56) References Cited

FOREIGN PATENT DOCUMENTS

| | | |
|---|---|---|
| JP | H07-037609 H | 2/1995 |
| JP | 2015197976 A | 11/2015 |

OTHER PUBLICATIONS

International Search Report and Written Opinion of the International Searching Authority for International Application No. PCT/US2019/051428, dated Dec. 19, 2019, 5 pgs.

International Search Report and Written Opinion of the International Searching Authority for International Application No. PCT/US2019/051428, dated Mar. 9, 2021, 5 pgs.

* cited by examiner

ZINC ALKALINE SECONDARY BATTERY INCLUDING ANCHORED ELECTROLYTE ADDITIVES

CROSS-REFERENCE TO RELATED APPLICATION

This application is a continuation-in-part of application Ser. No. 16/133,455, filed Sep. 17, 2018, which is incorporated by reference herein.

TECHNICAL FIELD

This disclosure relates to electrolytes and electrodes for zinc-based batteries.

BACKGROUND

The high specific capacity, rapid redox kinetics, compatibility with a variety of electrolytes, low toxicity, abundance and low cost of zinc makes it an attractive electrode material in batteries. While zinc electrodes have been successfully implemented in primary battery applications, extending cycle life is a major challenge with charge/discharge cycling of zinc electrodes in secondary batteries. Limited cycle life is associated with the redistribution of zinc active material (or shape change) and zinc dendrite formation during charge that result in reduced performance and internal shorting within the cell, respectively. These structural changes within the electrode are associated with the migration of soluble zinc species (i.e. $Zn(OH)_4^{2}$~) in the alkaline electrolyte during this reversible electrodeposition process.

SUMMARY

A secondary battery may include a separator assembly disposed between a positive electrode and zinc negative electrode in contact with an alkaline electrolyte including hexarnetaphosphate salt (e.g., potassium hexametaphosphate, sodium hexarnetaphosphate, etc.) and zinc acetate additives in the electrolyte and multi-valent oxide additives in the zinc electrode. The combination of electrolyte and electrode additives can improve cycle life compared to cells that do not contain these additives.

An alkaline electrolyte may include potassium hydroxide, sodium hexametaphosphate, and zinc acetate. It may also include additional hydroxide and borate additives. The hexametaphosphate and acetate anions form monodentate and polydentate ligands with the electrode metal cations decreasing zinc/zincate solubility and restricting the mobility of zincate ions. These coordinate complexes at the electrolyte-electrode interface can mitigate shape change of the zinc electrode, reduce zinc dissolution within the alkaline electrolyte, and suppress the formation of zinc passivation layers during discharge.

A negative electrode may include a metal current collector and active material including zinc, zinc oxide, and multi-valent oxide additives such as bismuth, indium, tin, and/or titanium oxide. The multi-valent oxide additives form chelation sites to anchor electrolyte additives of a corresponding electrolyte thereby reducing zinc solubility and inhibiting zinc dendrite growth by promoting uniform zinc electrodeposition.

In one example, a zinc alkaline secondary battery includes a positive electrode, a negative electrode including a multi-valent oxide species, a separator system disposed between the electrodes, and an alkaline electrolyte in contact with the negative electrode. The alkaline electrolyte includes hexametaphosphate salt and zinc acetate. Ligands from the hexametaphosphate salt and zinc acetate are anchored to the negative electrode via chelation sites created by the multi-valent oxide species. A concentration of the hexametaphosphate salt is in a range of 0.0001 to 0.004 molar. A concentration of the zinc acetate is in a range of 0.01 to 0.4 molar. A molar-to-molar ratio of hexametaphosphate salt to zinc acetate is in a range of 0.2 to 9.5%. The multi-valent oxide species may be bismuth oxide, indium oxide, tin oxide, titanium oxide, or a combination thereof. The multi-valent oxide species may be 2% to 25% by dry active mass of the negative electrode. The alkaline electrolyte may further include hydroxide. The hydroxide may be potassium hydroxide, cesium hydroxide, iridium hydroxide, lithium hydroxide, ruthenium hydroxide, or sodium hydroxide. The alkaline electrolyte may include borate salt, zinc oxide, or a dispersant. The negative electrode may include a borate salt, calcium hydroxide, calcium oxide, calcium zincate, strontium hydroxide, strontium oxide, strontium zincate, zinc oxide, or a combination thereof. The positive electrode may be a manganese dioxide, nickel hydroxide, oxygen, or silver electrode.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Methods that minimize shape change and dendrite growth include minimizing zinc and zincate ion mobility within the electrolyte and reducing the solubility of the zinc electrode. Effective approaches to reduce shape change and electrode solubility involve employing electrode additives, such as bismuth, borate, calcium, indium, lead, mercury, strontium, and tin, and salt additives in the electrolyte, such as acetate, borate, carbonate, phosphates, and sulfate. Zinc-based batteries require one or a combination of these additives to improve cycle file in secondary battery applications.

Electrolytes and electrodes for zinc-based secondary battery cells contemplated herein may contain additives that reduce zinc solubility and inhibit redistribution of active material in the zinc electrode. The combination of electrolyte additives, hexametaphosphate salt and zinc acetate, and multi-valent metal oxide dopants to the zinc electrode can improve cycle life by reducing zinc shape change and dendrite growth during charge/discharge cycling of cells. The hexametaphosphate and acetate anions are chelating agents that form coordinate covalent bonds with metal ions of the multi-valent oxide additives in the negative electrode. These coordinating complexes reduce mobility of zinc species within the electrolyte thereby suppressing shape change of the negative electrode.

Figure 1:
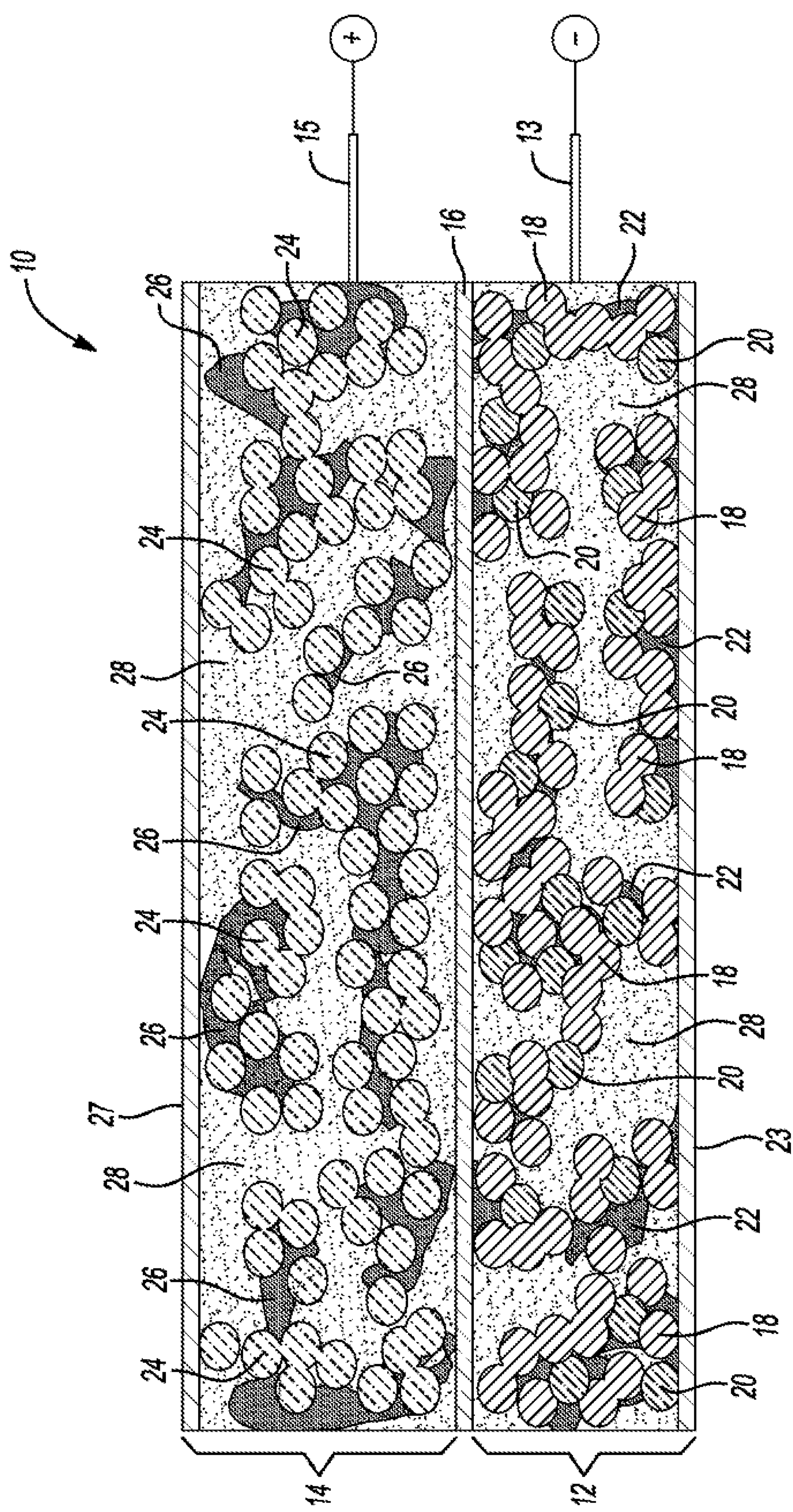
FIG. 1 is a side view, in cross-section, of a nickel zinc battery utilizing an alkaline electrolyte including hexametaphosphate salt, zinc acetate, and multi-valent oxide additives in the negative electrode.

A combination of zinc electrode and electrolyte additives were developed to improve the cycle life of batteries with zinc negative electrodes and alkaline electrolytes. FIG. 1 is a schematic of the cross section of an example electrode assembly 10, including anode and cathode structures 12, 14, corresponding current tabs 13, 15, and a separator system 16 (e.g., cellulose based compound, polyamide, polyolefin such as polypropylene and polyethylene, vinyl polymer, or a combination thereof). In this example, the anode structure 12 is a zinc negative electrode with a multi-valent additive, and the cathode structure 14 is a nickel hydroxide positive electrode. Other arrangements, however, are also possible. Specifically, the anode structure 12 includes zinc/zinc oxide 18 (depending on charge/discharge state), a multi-valent oxide species 20 (e.g., bismuth oxide, indium oxide, tin oxide, titanium oxide, or a combination thereof) bound with a hinder 22 (e.g., acrylonitrile-butadiene-styrene polymer, carboxymethyl cellulose, hydroxyethyl cellulose, polyethylene, polyvinyl alcohol, polyvinyl butyral, polyvinyl chloride, polyvinylidene fluoride, polytetrafluoroethylene, or a combination thereof), and a current collector 23. The multi-oxide species 20 may be 2% to 25% dry active mass of the anode structure 12. The cathode structure 14 includes nickel hydroxide 24 bound with a binder 26, and a current collector 27 (e.g., expanded metal, metal foam, or metal foil). The electrode structures 12, 14 are bathed in an alkaline electrolyte 28 that includes hexametaphosphate salt and zinc acetate, which may be at concentrations between 0.0001-0.004 molar and 0.01-0.4 molar, respectively. The molar-to-molar ratio of hexametaphosphate salt to zinc acetate may range between 0.2-9.5%. As such, ligands from the hexametaphosphate salt and zinc acetate are anchored to the anode structure 12 via chelation sites created by the multi-valent oxide species 20.

In certain arrangements, the alkaline electrolyte 28 may also include borate salt, hydroxide (e.g., potassium hydroxide, cesium hydroxide, indium hydroxide, lithium hydroxide, ruthenium hydroxide, or sodium hydroxide), zinc oxide, and or a dispersant.

Tests performed with nickel-zinc (Ni—Zn) small cells demonstrate the effectiveness of combining electrode and electrolyte additives to enhance cycle life.

Cells were fabricated with and without electrolyte and zinc electrode additives designed to enhance cycle life by reducing zinc solubility and mobility. Both the standard and modified zinc negative electrodes were fabricated with nucleation additives, hydrogen suppression additives, and binder additives. The modified zinc electrode contained an additional tin oxide additive to evaluate cycle life of cells with multivalent oxide additives. The standard electrolyte was a solution composed primarily of potassium hydroxide with lithium hydroxide, and zinc oxide. Modified electrolytes were solutions composed primarily of potassium hydroxide with lithium hydroxide, and varying amounts of zinc oxide, zinc acetate, sodium hexametaphosphate, sodium tetraborate decahydrate, sodium hydroxide, and indium hydroxide additives.

Figure 2:
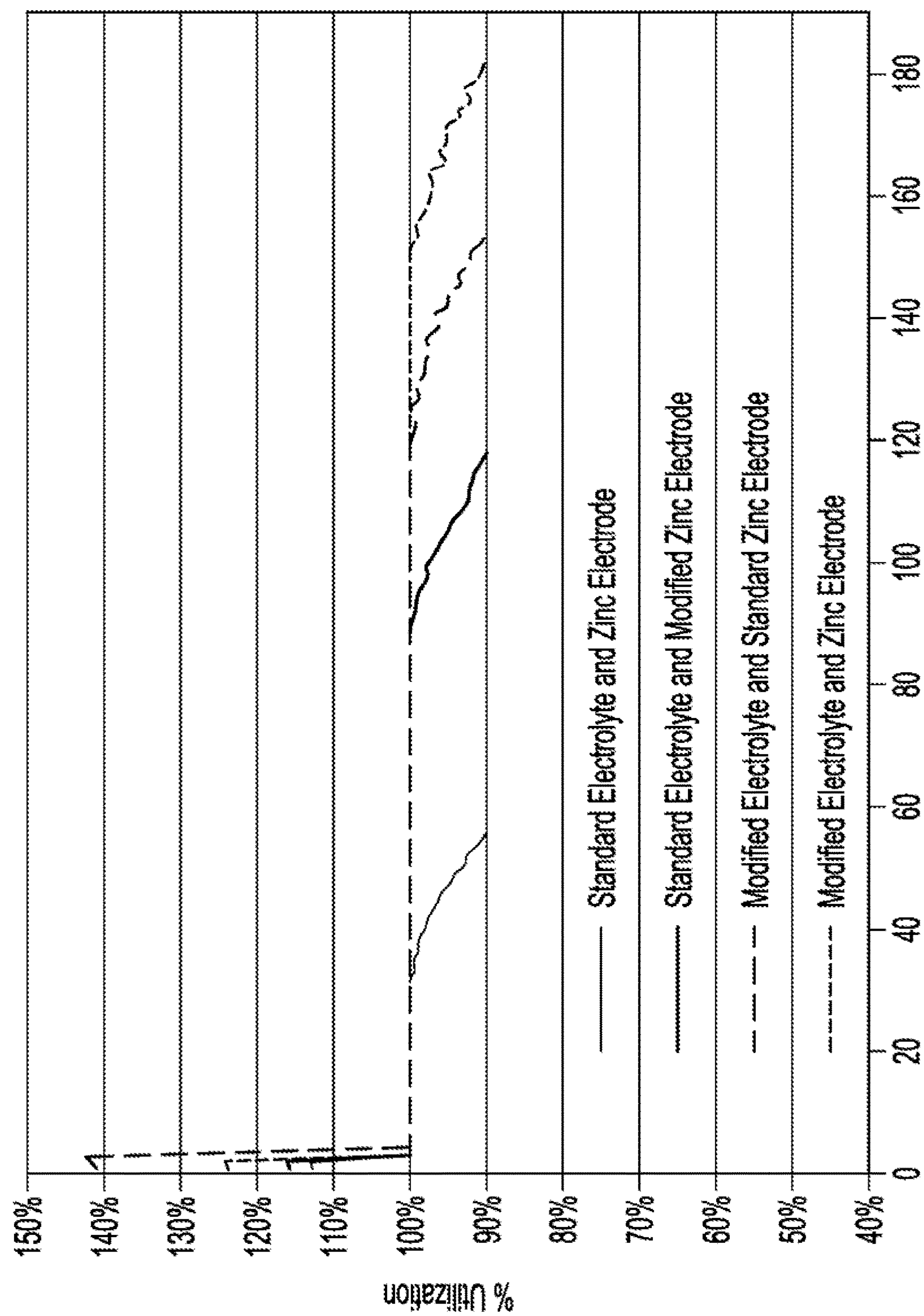
FIG. 2 is a plot comparing utilization versus cycle number for nickel zinc cells with and without electrolyte and zinc electrode additives.

Results from initial cycling tests at 100% depth of discharge reveal that cycle life can be increased with these additives. Cycle utilization as a function of cycle number is shown in FIG. 2. Utilization dropped to 95% after 47 cycles for the test cell with the standard electrolyte and electrode that do not contain additives that suppress zinc solubility and migration. A similar decrease in utilization was observed after 105 cycles for the cell with the standard electrolyte and modified zinc electrode containing tin oxide and after 142 cycles for the cell with the standard zinc electrode and modified electrolyte containing sodium hexametaphosphate, sodium tetraborate decahydrate, sodium hydroxide, and indium hydroxide additives. The most significant increase in cycle life was exhibited by the cell in Which the zinc electrode contained tin oxide and the electrolyte contained zinc acetate, sodium hexametaphosphate, sodium tetraborate hexahydrate, sodium hydroxide, and indium hydroxide additives. This cell with the modified electrolyte, containing 0.2% molar-to-molar ratio of sodium hexametaphosphate to zinc acetate, and modified zinc electrode reached 169 cycles before utilization decreased to 95%. The enhancement in cycle number at 95% utilization, with respect to the cell with the standard electrolyte and zinc electrode, corresponds to an increase in cycle life of ~120% for the cell with the modified zinc electrode, ~202% for the cell with the modified electrolyte, and ~260% for the cell with the modified electrolyte and zinc electrode. Taken together, these results confirm that hexametaphosphate salt and zinc acetate electrolyte additives combined with a zinc electrode containing multi-valent oxides unexpectedly improve Ni—Zn cell life performance under excessive cycling conditions.

Figure 3:
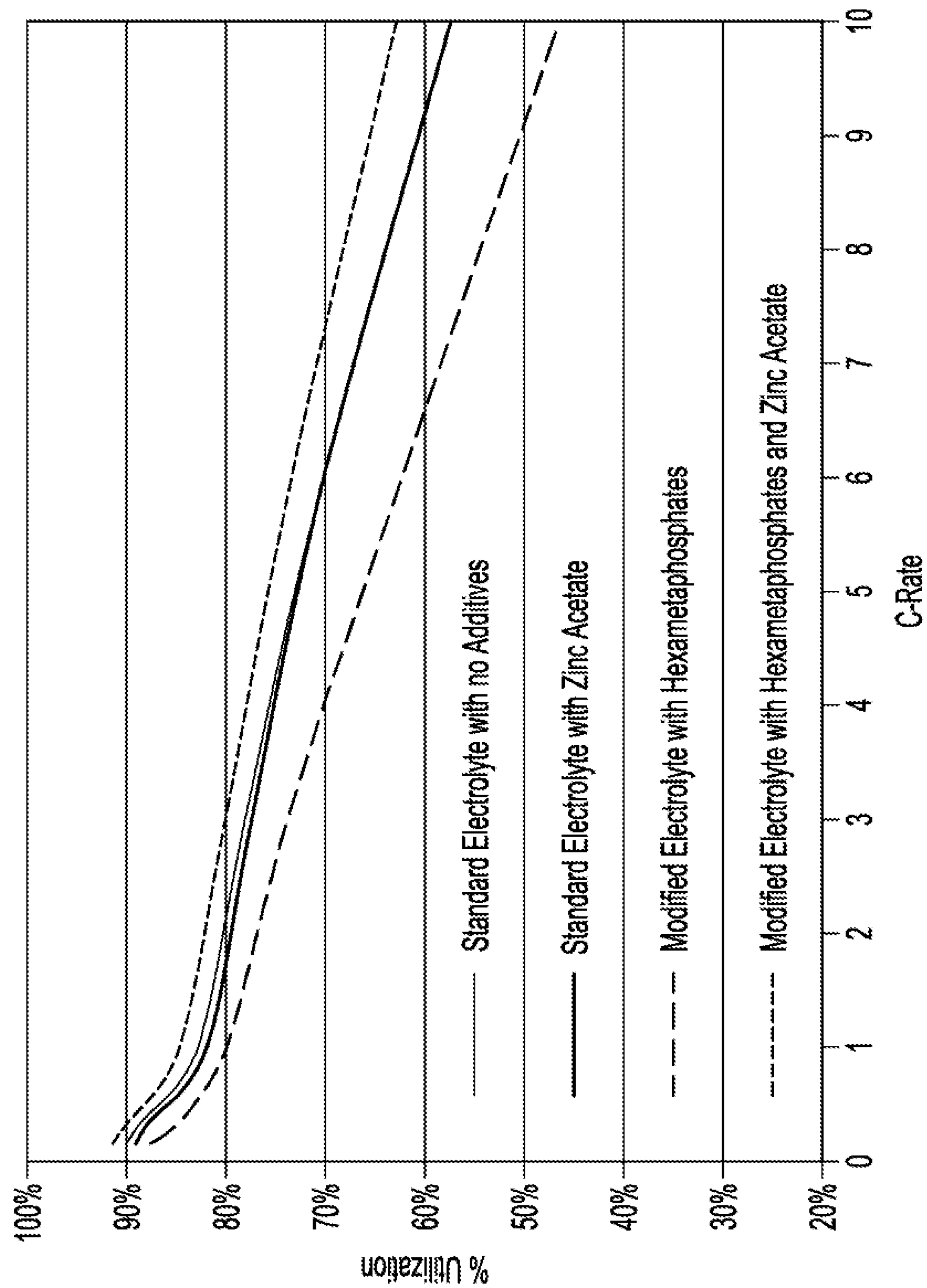
FIG. 3 is a plot comparing utilization versus C-rate for half-cells with and without electrolyte additives.

Additionally, half-cell tests with $Ni(OH)_2$ positive electrodes and nickel counter electrodes demonstrate that electrolytes which contain both sodium hexametaphosphate and zinc acetate have higher ionic conductivity within the electrolyte and do not negatively affect reactions at the positive electrode-electrolyte interface. During this test, the half-cell was cyclically charged and discharged at increasing discharge currents (or C-rates) to evaluate electrode and electrolyte performance at various discharge rates. As shown in FIG. 3, electrolytes containing zinc acetate have similar or higher utilization at high C-rates compared to electrolytes without zinc acetate. The modified electrolyte with hexametaphosphate salt and zinc acetate in FIG. 3, which is the same electrolyte composition with the longest cycle life shown in FIG. 2 ("Modified Electrolyte and Zinc Electrode" of FIG. 2), has the highest overall utilization. When zinc acetate is excluded, which is the modified electrolyte with hexametaphosphate salt in FIG. 3, utilization deceases. These results indicate that presence of zinc acetate improves performance. However, the addition of zinc acetate to the standard electrolyte composition, which is the standard electrolyte with zinc acetate in FIG. 3, does not improve utilization. Similar utilization is observed for the standard electrolyte with and without zinc acetate. Although utilization is lower for cells with sodium hexametaphosphate and no zinc acetate, half-cell tests with both electrolyte additives exhibit unexpectedly higher utilization at all of the tested C-rates. Based on these results, the electrochemical reactions at $Ni(OH)_2$ positive electrodes are improved/more efficient in the presence of both hexametaphosphate salt and zinc acetate.

Figure 4:
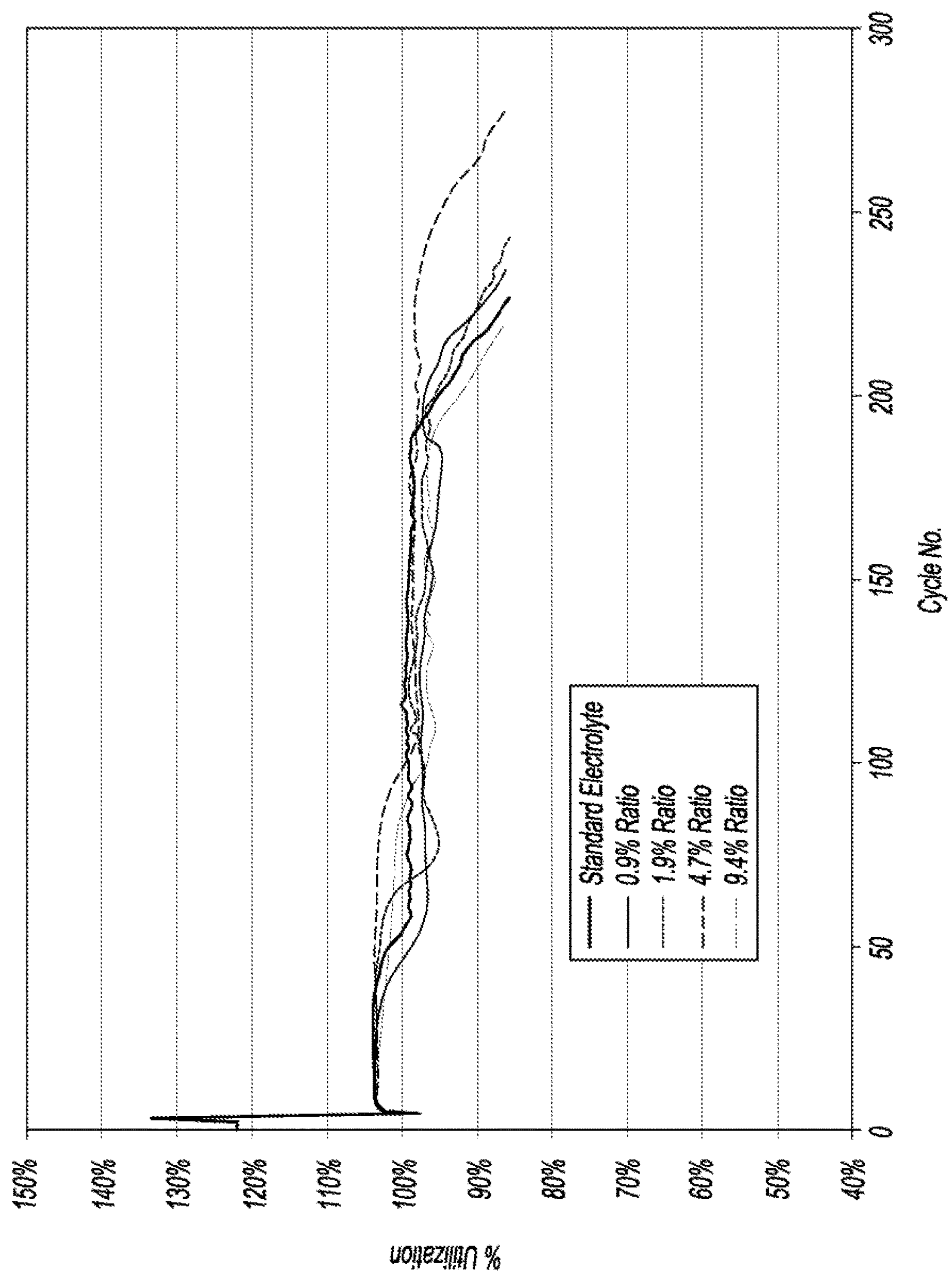
FIG. 4 is a plot comparing utilization versus cycle number for nickel zinc cells with and without electrolyte additives.

As shown in FIG. 4, cycling tests at 100% depth of discharge reveal that cycle life can be increased by the addition of hexametaphosphate salt and zinc acetate to the standard electrolyte. The composition of the standard electrolyte is the same in FIGS. 2-4. Cycle life can be improved using electrolytes including hexametaphosphate salt and zinc acetate, which may be at most preferred concentrations between 0.0003-0.0015 molar and 0.016-0.032 molar, respectively. The most preferred molar-to-molar ratio of hexametaphosphate salt to zinc acetate may range between 0.9 to 4.7%. Utilization for the test cell with the standard electrolyte without sodium hexametaphosphate and zinc acetate reached 90% after 215 cycles. Tests cells with 0.9% and 1.9% of these additives completed 225 cycles before dropping to 90% utilization while the cell with 4.7% was capable of reaching 260 cycles. The test cell with the highest ratio, 9.4%, had minimal improvement and had the shortest number of cycles, 208, before showing a similar reduction in utilization. Although the two cells with the lowest amount of additive concentrations, 0.9% and 1.9%, exhibited a 5% increase in cycle life relative to the standard, the cycle number for the cell with 4.7% corresponds to a 21% improvement.

Based the unexpected results, shown in FIG. 3, and the relative concentration results, shown in FIG. 4, electrolytes containing preferably 0.0002-0.002 molar hexametaphosphate salt, preferably 0.01-0.2 molar zinc acetate, and preferably 0.2 to 5.0% molar-to-molar ratio of hexametaphosphate salt to zinc acetate can improve cycling performance of Ni—Zn cells. These studies demonstrate that the combination of hexametaphosphate salt and zinc acetate additives in the electrolyte can improve cycle life compared to cells that do not contain these additives.

The words used in the specification are words of description rather than limitation, and it is understood that various changes may be made without departing from the spirit and scope of the disclosure and claims.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A zinc alkaline secondary battery comprising:
a positive electrode;
a negative electrode including a multi-valent oxide species;
a separator system disposed between the electrodes; and
an alkaline electrolyte in contact with the negative electrode and including hexametaphosphate salt and zinc acetate, wherein ligands from the hexametaphosphate salt and zinc acetate are anchored to the negative electrode via chelation sites created by the multi-valent oxide species, wherein a concentration of the hexametaphosphate salt is in a range of 0.0001 to 0.004 molar, wherein a concentration of the zinc acetate is in a range of 0.01 to 0.4 molar, and wherein a molar-to-molar ratio of hexametaphosphate salt to zinc acetate is in a range of 0.2 to 5.0%.

2. The zinc alkaline secondary battery of claim 1, wherein the concentration of the hexametaphosphate salt is in a range of 0.0002 to 0.002 molar.

3. The zinc alkaline secondary battery of claim 1, wherein the concentration of the hexametaphosphate salt is in a range of 0.0003 to 0.0015 molar.

4. The zinc alkaline secondary battery of claim 1, wherein the concentration of the zinc acetate is in a range of 0.01 to 0.2 molar.

5. The zinc alkaline secondary battery of claim 1, wherein the concentration of the zinc acetate is in a range of 0.016 to 0.032 molar.

6. The zinc alkaline secondary battery of claim 1, wherein the molar-to-molar ratio of hexametaphosphate salt to zinc acetate is in a range of 0.9 to 4.7%.

7. The zinc alkaline secondary battery of claim 1, wherein the multi-valent oxide species includes bismuth, indium, tin, titanium, or a combination thereof.

8. The zinc alkaline secondary battery of claim 1, wherein the multi-valent oxide species are 2% to 25% by dry active mass of the negative electrode.

9. The zinc alkaline secondary battery of claim 1, wherein the alkaline electrolyte further includes hydroxide.

10. The zinc alkaline secondary battery of claim 9, wherein the hydroxide is potassium hydroxide, cesium hydroxide, indium hydroxide, lithium hydroxide, ruthenium hydroxide, or sodium hydroxide.

11. The zinc alkaline secondary battery of claim 1, wherein the alkaline electrolyte includes borate.

12. The zinc alkaline secondary battery of claim 1, wherein the alkaline electrolyte includes zinc oxide.

13. The zinc alkaline secondary battery of claim 1, wherein the alkaline electrolyte includes a dispersant.

14. The zinc alkaline secondary battery of claim 1, wherein the negative electrode includes a borate salt, calcium hydroxide, calcium oxide, calcium zincate, strontium hydroxide, strontium oxide, strontium zincate, zinc oxide, or a combination thereof.

15. The zinc alkaline secondary battery of claim 1, wherein the positive electrode is a manganese dioxide, nickel hydroxide, oxygen, or silver electrode.

* * * * *